(12) United States Patent
Schoonveld (10) Patent No.: US 9,251,502 B2
(45) Date of Patent: Feb. 2, 2016

(54) MAINTENANCE SYSTEM FOR AIRCRAFT FLEET AND METHOD FOR PLANNING MAINTENANCE

(71) Applicant: GE Aviation Systems LLC, Grand Rapids, MI (US)

(72) Inventor: Steve John Schoonveld, Grand Rapids, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 182 days.

(21) Appl. No.: 13/666,394

(22) Filed: Nov. 1, 2012

(65) Prior Publication Data

US 2014/0121885 A1    May 1, 2014

(51) Int. Cl.
*G06Q 10/10* (2012.01)

(52) U.S. Cl.
CPC ................................. *G06Q 10/10* (2013.01)

(58) Field of Classification Search
CPC ....... G06Q 10/10; G06Q 10/06; G06Q 10/20; G06Q 50/30
USPC .............. 701/29.3, 29.4; 705/7.11, 7.22
See application file for complete search history.

(56) References Cited

U.S. PATENT DOCUMENTS

| | | | |
|---|---|---|---|
| 6,263,265 B1 | 7/2001 | Fera | |
| 6,324,659 B1 | 11/2001 | Pierro | |
| 6,879,893 B2 | 4/2005 | Woodard et al. | |
| 7,006,903 B2 | 2/2006 | Smith et al. | |
| 7,184,866 B2 | 2/2007 | Squires et al. | |
| 7,440,906 B1 * | 10/2008 | Wetzer et al. | 705/7.12 |
| 7,457,763 B1 * | 11/2008 | Garrow et al. | 705/7.24 |
| 7,502,744 B2 * | 3/2009 | Garrow et al. | 705/1.1 |
| 7,715,961 B1 | 5/2010 | Kargupta | |
| 7,860,618 B2 | 12/2010 | Brandstetter et al. | |
| 7,958,062 B2 | 6/2011 | Yan et al. | |
| 2002/0143421 A1 * | 10/2002 | Wetzer | 700/100 |
| 2002/0143443 A1 | 10/2002 | Betters et al. | |
| 2002/0184178 A1 | 12/2002 | Tasooji et al. | |
| 2003/0033178 A1 | 2/2003 | Black et al. | |
| 2003/0114965 A1 | 6/2003 | Fiechter et al. | |
| 2003/0158772 A1 * | 8/2003 | Harris | 705/10 |

(Continued)

FOREIGN PATENT DOCUMENTS

WO       03069436 A2     8/2003

OTHER PUBLICATIONS

Peng et al., A Scheduling Method of Maintenance Work Based on Dynamic Priority, Aug. 20-21, 2011, Applied Informatics and Communication—Communications in Computer and Information Science vol. 228, 2011.*

(Continued)

*Primary Examiner* — John Q Nguyen
*Assistant Examiner* — Nadeem Odeh
(74) *Attorney, Agent, or Firm* — GE Global Patent Operation; William S. Munnerlyn (57) ABSTRACT

A maintenance system for a fleet of aircraft and a method of planning maintenance for a fleet of aircraft that includes identifying a maintenance schedule having at least one routine maintenance action for an aircraft to be maintained, generating a non-routine maintenance task schedule comprising non-routine maintenance tasks, and generating a combined schedule comprising a combination of the maintenance schedule and the non-routine maintenance task schedule.

17 Claims, 3 Drawing Sheets

(56) References Cited

U.S. PATENT DOCUMENTS

| | | |
|---|---|---|
| 2004/0078125 A1 | 4/2004 | Woodard et al. |
| 2004/0153437 A1 | 8/2004 | Buchan |
| 2004/0176887 A1 | 9/2004 | Kent et al. |
| 2005/0004821 A1* | 1/2005 | Garrow et al. .................... 705/7 |
| 2005/0228558 A1 | 10/2005 | Valette et al. |
| 2006/0064291 A1 | 3/2006 | Pattipatti et al. |
| 2006/0097854 A1 | 5/2006 | Basu et al. |
| 2006/0126608 A1 | 6/2006 | Pereira et al. |
| 2006/0265261 A1* | 11/2006 | Wetzer et al. .................... 705/7 |
| 2007/0260726 A1 | 11/2007 | Rozak et al. |
| 2008/0039993 A1 | 2/2008 | Cleary et al. |
| 2008/0125933 A1* | 5/2008 | Williams et al. ................ 701/30 |
| 2008/0147263 A1* | 6/2008 | Sinex ............................... 701/29 |
| 2008/0147264 A1* | 6/2008 | Doulatshahi et al. ........... 701/30 |
| 2008/0312783 A1 | 12/2008 | Mansouri et al. |
| 2009/0055339 A1 | 2/2009 | Bernard |
| 2009/0138141 A1 | 5/2009 | Nwadiogbu et al. |
| 2009/0276276 A1* | 11/2009 | Black et al. ....................... 705/8 |
| 2010/0030418 A1 | 2/2010 | Holland |
| 2010/0042287 A1 | 2/2010 | Zhang et al. |
| 2010/0070237 A1* | 3/2010 | Yitbarek et al. ............... 702/177 |
| 2010/0161169 A1 | 6/2010 | Ramanathan et al. |
| 2010/0217638 A1 | 8/2010 | Dickson et al. |
| 2011/0029804 A1 | 2/2011 | Hadden et al. |
| 2011/0046842 A1 | 2/2011 | Smith |
| 2011/0087387 A1 | 4/2011 | Safa-Bakhsh et al. |
| 2011/0106818 A1 | 5/2011 | Zhang et al. |
| 2011/0118905 A1 | 5/2011 | Mylaraswamy et al. |

OTHER PUBLICATIONS

EP Search Report and Written Opinion dated Feb. 6, 2014, issued in connection with corresponding EP Application No. 13190955.8.

* cited by examiner

Figure 3

MAINTENANCE SYSTEM FOR AIRCRAFT FLEET AND METHOD FOR PLANNING MAINTENANCE

BACKGROUND OF THE INVENTION

Operators in an Airline Operations Center (AOC) manage the execution of thousands of flights a day while attempting to minimize costly delays and cancellations and while complying with complex maintenance constraints. A challenge for airlines is to limit inefficiency in the airline and manage information efficiently to alleviate the impact of unforeseen maintenance disruptions.

BRIEF DESCRIPTION OF THE INVENTION

In one embodiment, the invention relates to a maintenance system for a fleet of aircraft, including a maintenance database comprising at least one maintenance schedule comprising a list of routine maintenance actions for the aircraft, a non-routine maintenance database comprising at least non-routine maintenance historical data for the aircraft, a health database comprising operation data for the aircraft, and a planning module configured to query the maintenance database, non-routine maintenance database, and the health database and identify anticipated non-routine maintenance tasks having a correlation with at least one of the routine maintenance actions.

In another embodiment, the invention relates to a method of planning maintenance for a fleet of aircraft, the method including identifying a maintenance schedule having at least one routine maintenance action for an aircraft to be maintained, generating a non-routine maintenance schedule comprising non-routine maintenance having a predetermined probability of occurrence based on historical data for the fleet and having a correlation to the at least one routine maintenance action and generating a task schedule comprising a combination of the maintenance schedule and the non-routine maintenance schedule.

DESCRIPTION OF EMBODIMENTS OF THE INVENTION

Figure 1:
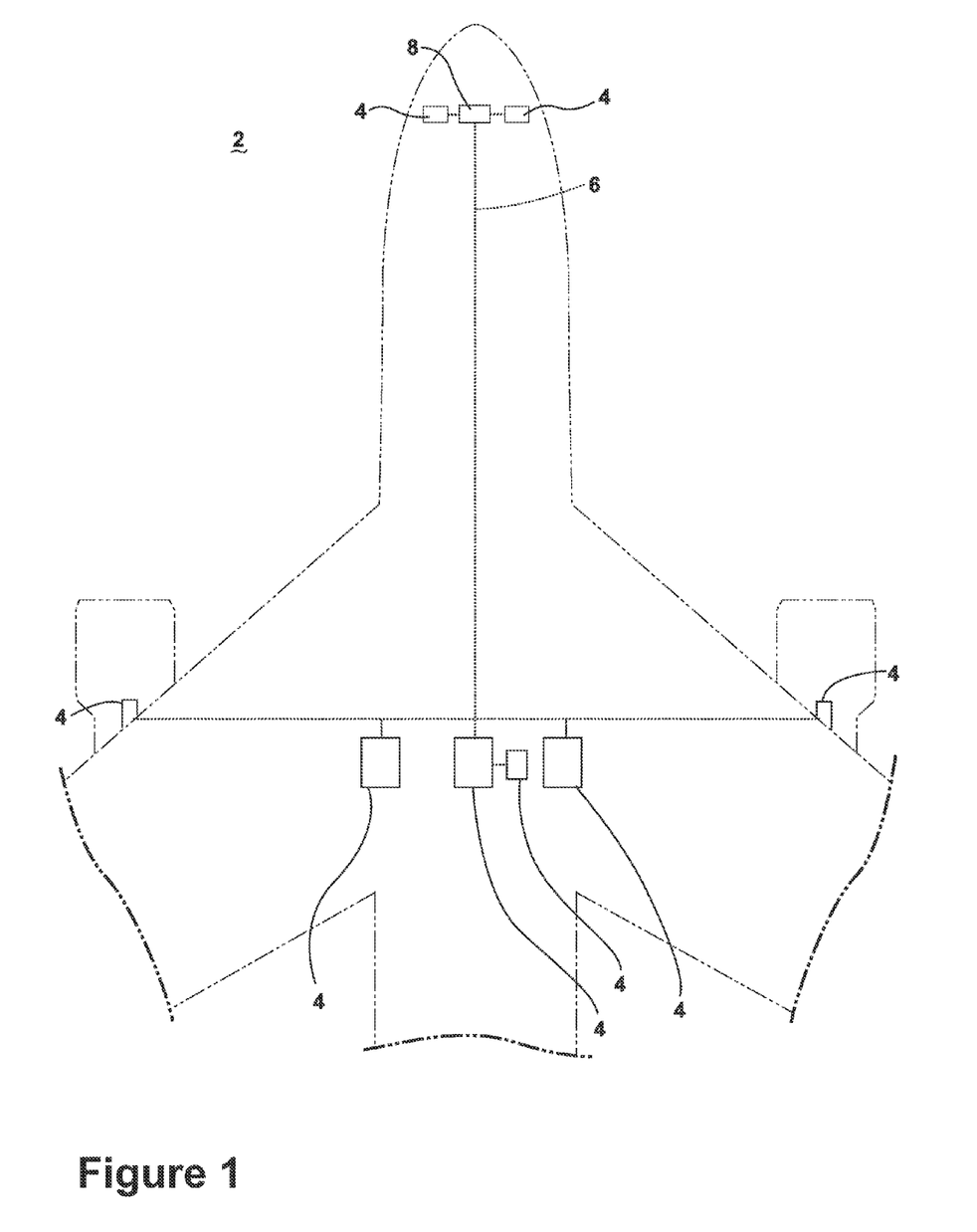
FIG. 1 is a schematic illustration of an aircraft having a plurality of aircraft systems.

An initial explanation of an aircraft environment will be useful in understanding the inventive concepts. FIG. 1 schematically illustrates a portion of a vehicle in the form of an aircraft 2 having a plurality of aircraft member systems 4 that enable proper operation of the aircraft 2 and a communication system 6 over which the plurality of aircraft member systems 4 may communicate with each other and an aircraft health management (AHM) computer 8. It will be understood that the inventive concepts may be applied to one or multiple aircraft, including groupings of aircraft, such as a fleet of aircraft.

The AHM computer 8 may include or be associated with, any suitable number of standard components including individual microprocessors, power supplies, storage devices, and interface cards. The AHM computer 8 may receive inputs from any number of member systems or software programs responsible for managing the acquisition and storage of data. The AHM computer 8 is illustrated as being in communication with the plurality of aircraft systems 4 and it is contemplated that the AHM computer 8 may execute one or more health monitoring functions or be part of an Integrated Vehicle Health Management (IVHM) system to assist in diagnosing or predicting faults in the aircraft 2. During operation, the multiple aircraft systems 4 may send status messages regarding at least some of the operational data of the multiple aircraft systems 4 and the AHM computer 8 may make a determination of a health function of the aircraft 2 based on such data. During operation, inputs and outputs of the multiple aircraft systems 4 may be monitored by the AHM computer 8 and the AHM computer 8 may make a determination of a health function of the aircraft 2 based on such data. For example, diagnostic and prognostic analytics may apply knowledge to such data in order to extract information and value. In this manner, the AHM computer of the IVHM system may indicate that a fault will occur or has a high probability of occurring with the aircraft 2.

The embodiments of the invention provide a system and method for planning maintenance for an aircraft or fleet of aircraft to improve maintenance planning by including non-routine repairs during routine maintenance visits based on when non-routine maintenance is predicted to occur, and/or when the non-routine maintenance is related, such as physical proximity or related system, as the routine maintenance. Currently, when planning maintenance for a maintenance visit, for example one greater than two days, maintenance planners may package tasks that are due to be completed based on some hard requirement such as hours and cycles. Maintenance faults that are currently deferred on the aircraft are included as well. Often times when performing such maintenance other issues, called non-routines, are discovered. For example, when opening a panel on the aircraft corrosion, frayed wiring, leaks, etc. may be found and must then be corrected. Sophisticated airlines may plan for a certain amount of time in the planned maintenance visit to be consumed by such non-routine maintenance; however, this often results in inefficiencies as the visits may be planned for a longer duration then is required and therefore the aircraft does not have any planned utilization when it available early from maintenance. Applying non-routine maintenance task factors to schedule maintenance visits uniformly across a fleet results in inefficiencies as aircraft differ in configuration and age which results in varying levels of non-routine rates. Furthermore, maintenance visits may run longer when more non-routine maintenance than estimated is found and operational disruptions in the fleet may occur because the aircraft is now unavailable.

Figure 2:
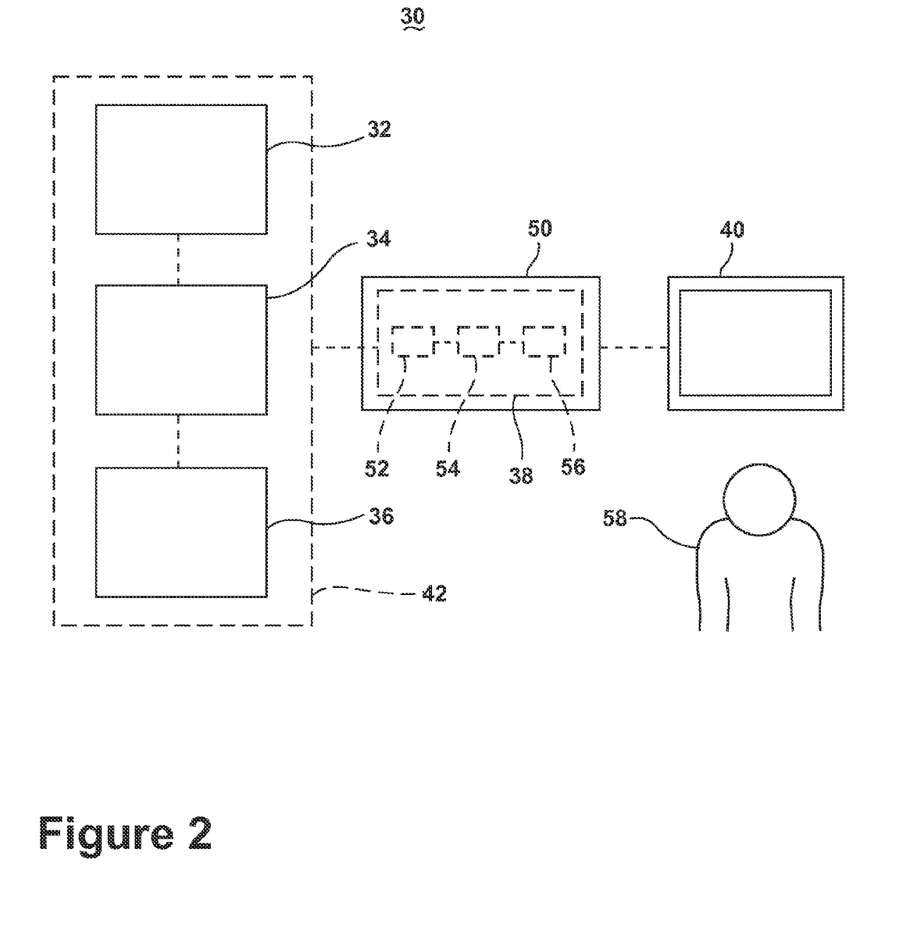
FIG. 2 is a schematic view of a maintenance system according to an embodiment of the invention.

FIG. 2 schematically illustrates a maintenance system 30, which includes a maintenance database 32, a non-routine maintenance database 34, a health database 36, a planning module 38, and a generation module 40. It will be understood that the maintenance, non-routine maintenance, and health databases 32, 34, 36 may each be any suitable database, including that each may be a single database having multiple sets of data, multiple discrete databases linked together, or even a simple table of data. Regardless of the type of database each of the maintenance, non-routine maintenance, and health databases 32, 34, 36 may be provided on storage medium on a computer or may be provided on a computer readable medium, such as a database server, which may be coupled to a communication network for accessing the database server. It is contemplated that the maintenance, non-routine maintenance, and health databases 32, 34, 36 may be included in a single database such as a computer searchable database 42. It is further contemplated that the computer searchable database 42 may also include additional data or information to aid in the determination of what anticipated non-routine maintenance tasks may be included during the routine maintenance actions.

The maintenance database 32 may include at least one maintenance schedule for the aircraft in the fleet. This may include a list of routine maintenance actions for the aircraft. Routine maintenance actions may include cleaning the aircraft and components, application of corrosion prevention compound, lubricating parts, servicing hydraulics and pneumatic systems, replacing components, performing visual inspections and any other task that is accomplished at specified intervals, that prevent deterioration of the safety and reliability levels of the aircraft. By way of non-limiting example, the routine maintenance actions may include timing of the routine maintenance and duration of the routine maintenance. The maintenance database 32 may also include information related to the total time that the aircraft will be available for maintenance.

The non-routine maintenance database 34 may include at least non-routine maintenance historical data for the aircraft. Such information may include previous non-routine maintenance that has been performed on the aircraft. Such information may be related to maintenance that is not routine and may include when the non-routine maintenance occurred, what tasks were performed, what replacement parts, if any, were installed. Non-routine maintenance may include any maintenance or repair that is not routine including by way of non-limiting examples, replacing failed parts, replacing parts likely to fail, and any other maintenance performed outside of a regularly scheduled interval such as fluid leaks, corrosion discovered during visual inspections or during the performance of regularly scheduled maintenance, etc. In this manner, it may be determined what failures have occurred in the aircraft, what potential failures have been avoided, and what has been done during previous non-routine maintenance.

The health database 36 may include operation data for the aircraft. Operation data for the aircraft may include information regarding the health of the aircraft or may include information from which the health of the aircraft may be determined Operation data may also include information related to aircraft and component usage including hours used or cycles used information. Operation data may also include age of the aircraft or component and the configuration of the aircraft or component including what type of engine, part numbers, suppliers, etc. Furthermore, the health database 36 may also include prognostic aircraft health data, which may indicate potential failures in the aircraft as well as the probability of such failures. The aircraft may include an AHM computer or health management system or have similar capabilities and such information may be offloaded from the aircraft to the computer searchable database 42 and may provide operation data and be used to predict failures in the aircraft. The predicted failures may be considered non-routine maintenance tasks.

The planning module 38 may be configured to query the maintenance database 32, non-routine maintenance database 34, and the health database 36. The planning module 38 may identify anticipated non-routine maintenance tasks having a correlation with at least one of the routine maintenance actions. The planning module 38 may be executed on a computer 50 configured to access or query the computer searchable database 42. It will be understood that the planning module 38 may access the computer searchable database 42 via a communication network or computer network coupling the planning module 38 to the computer searchable database 42. By way of non-limiting example, such a computer network may be a local area network or a larger network such as the internet. It is contemplated that the planning module 38 may make repeated queries of the computer searchable database 42.

The planning module 38 may optionally include a probability module 52, a correlation module 54, and a business rules module 56. The probability module 52 may be configured to identify anticipated non-routine maintenance tasks having a threshold probability of occurring. The threshold probability of occurring may be determined by the probability module 52 based on information from the non-routine maintenance, and health databases 34, 36. Such a threshold may be set at any suitable predetermined value; however, it is contemplated that the predetermined value may be high enough so that only the most relevant non-routine maintenance will be included. The correlation module 54 may identify at least one of the routine maintenance actions that at least one of the anticipated non-routine maintenance tasks can be completed with. For example, based on information from the maintenance, non-routine maintenance, and health databases 32, 34, 36 and information from the probability module the correlation module 54 may determine that maintenance will take place within a certain panel on the aircraft. The correlation module 54 may determine that a component in the same panel has a threshold probability of failing and may determine that a non-routine maintenance task should be completed during the planned maintenance visit. Thus, based on the maintenance tasks that must be performed as part of the maintenance visit due to hard requirements like hours and cycles used and the aircraft characteristics, a probabilistically determined list of non-routine maintenance tasks that have a high probability of occurrence and correlation with the planned maintenance is developed. The business rules module 56 may contain one or more operational constraints, optimization criteria and operational objectives upon which the tasks from the correlation module 54 are selected for incorporation for the maintenance plan. The business rules module 56 may determine which of the tasks presented from the correlation module 54 meet the operational objectives such as maximizing aircraft availability. It will be understood that the planning module 38 may differ from the above described examples including that it may only include the probability module 52 and correlation module 54.

Alternatively, the planning module 38 may identify anticipated non-routine maintenance tasks having a correlation with at least one of the routine maintenance actions by permutating over the computer searchable database 42 a maintenance algorithm that determines anticipated non-routine maintenance tasks to be included during the at least one of the routine maintenance actions. The algorithm may incorporate the prognostic aircraft health data in identifying anticipated non-routine maintenance tasks having a correlation with at least one of the routine maintenance actions. By way of non-limiting example, using aircraft health data it may be determined that the cabin pressure controller has a remaining useful life of 10 days with a 90% level of confidence. Correlating the predicted failure with upcoming maintenance tasks it may be determined that scheduled maintenance is to be performed in the same area as the cabin pressure controller in the next 8 days. The algorithm may then assess business rules such as maximize aircraft availability and decides whether to include a non-routine task for the replacement of the cabin pressure controller in conjunction with the existing maintenance tasks. The algorithm may take into account operation data such as age and hours used. This may prove useful as younger aircraft are likely to have fewer unplanned maintenance issues, such as corrosion, while undergoing maintenance visits. As an aircraft matures, the likelihood of discovering maintenance issues while performing scheduled maintenance is greater. Further, aircraft configuration information may be used in determining probabilities of failures as well. Aircraft configurations may vary even within a model. For example, an aircraft may be configured with additional fire bottles and therefore have a higher likelihood of needing maintenance on that system as opposed to an aircraft configured with fewer fire bottles.

As new maintenance actions are performed, as the aircraft accumulates usage, as the configuration changes, and as the current aircraft health status changes the planning module 38 may continuously determine what non-routine maintenance tasks have a correlation with at least one of the routine maintenance actions. The non-routine maintenance tasks that have a correlation with at least one of the routine maintenance actions may then be incorporated as part of a planned maintenance visit.

The planning module 38 may refine the number of non-routine maintenance tasks by taking operational criteria into account. For example, if an aircraft is going to be down for an extended period of time there may be a desire to include tasks that have a lower probability of failure, i.e. 90% likelihood of failure instead of just 95% likelihood of failure. The planning module 38 may be capable of considering other criteria such as economic impacts or operational impacts to the fleet. Such input may also be used to develop a list of non-routine maintenance tasks that are in line with organization goals such as aircraft availability, maintenance yield, etc. The list of likely non-routine maintenance tasks is presented to the planner to incorporate in to a package. Furthermore, the planning module 38 may take into account additional inputs to receive recommendations that best fit the current needs. For example, a maintenance location may be available for five days and based on this input the planning module may refine the recommended maintenance actions to include only those non-routines with the highest probability that can be accomplished in the allotted time.

The generation module 40 may generate a task schedule that is a combination of the maintenance schedule and at least one of the identified non-routine maintenance tasks. The generation module may include a display to display the task schedule to a user 58 or may be configured to output or relay the task schedule. Although the planning module 38 and the generation module 40 have been illustrated separately, it is contemplated that they may be included in a single device.

During operation, the maintenance system 30 may determine non-routine maintenance that should be taken care of during routine maintenance. Initially, the planning module 38 may query the computer searchable database 42 and may recommend non-routine maintenance tasks to include during a maintenance visit. The recommended non-routine maintenance actions may be based on an adjustable probability of occurrence. Additionally, the planning module 38 may take in to account the current health status of the aircraft and may provide non-routine maintenance activities to include based on a probability of near future failure in the context of various other factors including cost, time, labor availability, etc. A technical effect is that the operational efficiency of the fleet of aircraft may improve through use of the maintenance system 30 because non-routine maintenance tasks may be incorporated into routine maintenance visits and maintenance tasks are based on the unique characteristics of a specific aircraft. In this manner, the maintenance system 30 may include elements of prediction of impending failure and optimization of these options to result in recommended actions. The planning module 38 may take into account the planned maintenance actions down to the task level to determine the correlation with non-routine maintenance. The tasks and durations for non-routine maintenance to be included with the routine maintenance may be based on an adjustable probability of occurrence resulting in maintenance visits being better planned according to their likely duration and allows for higher aircraft utilization and less operational disruption. Since the aircraft will be out of service the planning module 38 may also include upcoming maintenance tasks even though they are not yet due to best achieve operational goals such as maintenance yields, maintenance utilization, aircraft availability and maintenance costs, etc.

Figure 3:
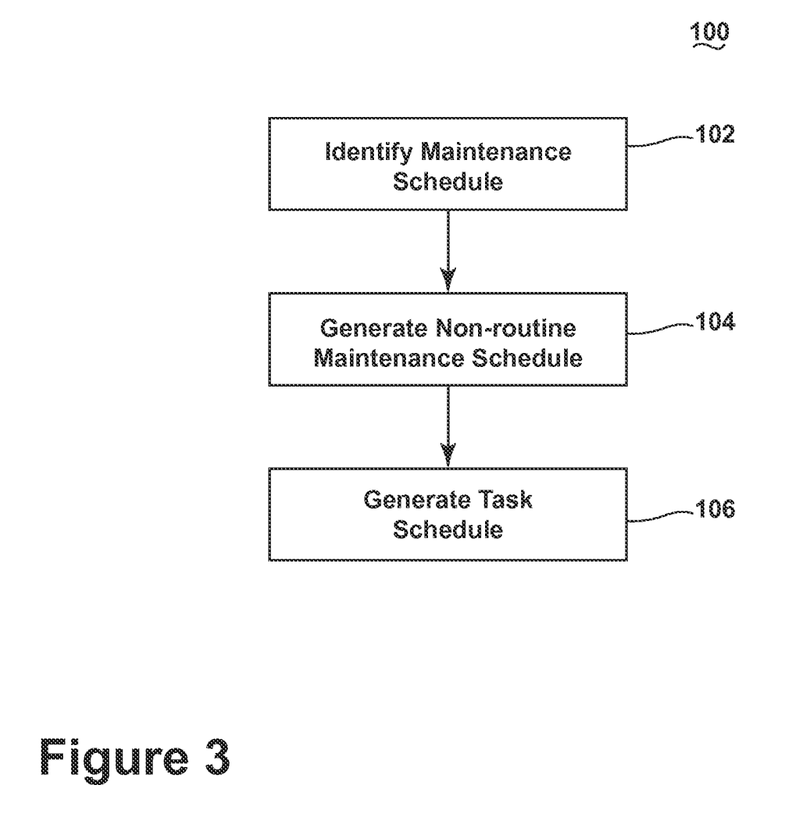
FIG. 3 is a flow chart of a method according to another embodiment of the invention.

In accordance with an embodiment of the invention, FIG. 3 illustrates a method 100 for planning maintenance for a fleet of aircraft. The sequence of steps depicted is for illustrative purposes only, and is not meant to limit the method 100 in any way as it is understood that the steps may proceed in a different logical order or additional or intervening steps may be included without detracting from embodiments of the invention.

The method 100 may begin with identifying a maintenance schedule having at least one routine maintenance action for an aircraft to be maintained at 102. This may include timing and duration of the routine maintenance action. At 104, a non-routine maintenance schedule comprising non-routine maintenance having a predetermined probability of occurrence based on historical data for the fleet and having a correlation to the at least one routine maintenance action may be generated. This may include determining the amount of predetermined probability of occurrence based on the historical data for the fleet. For example, determining the probability of the non-routine maintenance may include determining a potential failure in at least one component of the aircraft. Determining a potential failure in the at least one component may include evaluating at least one of multiple constraints including a predicted life of the component and a failure rate of the component. A failure rate of the component may include at least one of an actual failure rate or an artificial failure rate. Prognostic aircraft health data may be used to determine an estimated time to failure or estimated remaining useful life. In generating the non-routine maintenance schedule timing and duration of the routine maintenance action may be taken into account as well as the amount of the predetermined probability of the non-routine maintenance. At 106, a task schedule comprising a combination of the maintenance schedule and the non-routine maintenance schedule may be generated.

The above embodiments provide a variety of benefits including that the time aircraft are grounded may be minimized, delays may be minimized, and flight cancelations may be minimized or eliminated. The above described embodiments plan proactive maintenance and solve the difficulty in estimating the tasks and durations of a maintenance visit. Previously only known requirements or existing failures could be planned for and often times an aircraft would leave a maintenance visit only to discover maintenance issues days later. Additionally, maintenance tasks may be discovered only after the aircraft enters maintenance and results in the aircraft being unavailable and therefore disrupting flight schedules. The above embodiments use current aircraft health and a number of variable input criteria to provide proactive maintenance tasks to be performed, which reduce the occurrence of maintenance issues shortly after leaving a maintenance visit, reduce the likelihood of aircraft being late out of maintenance due to improved planning and therefore few operational disruptions. Furthermore, the above embodiments allow for a plurality of input criteria to be considered when determining non-routine maintenance to be incorporated into the planned maintenance. The above embodiments increase aircraft utilization and reduce costly operational disruptions. Further, the above embodiments, allow proactive maintenance actions to be included in the maintenance visit at a lower cost because the aircraft is already opened for other maintenance. This further reduces operational disruptions and maintenance costs that occur shortly after leaving a maintenance visit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A maintenance system for a fleet of aircraft, the system comprising:
    a maintenance database comprising at least one maintenance schedule comprising a list of routine maintenance actions for the aircraft;
    a non-routine maintenance database comprising at least non-routine maintenance historical data for the aircraft;
    a health database comprising operation data for the aircraft; and
    a planning module configured to query the maintenance database, non-routine maintenance database, and the health database, such that the planning module is configured to identify anticipated non-routine maintenance tasks having a threshold probability of occurrence based on historical data for the fleet and aircraft health data and having a correlation with at least one of the routine maintenance actions, wherein the correlation includes that the anticipated non-routine maintenance tasks and the at least one of the routine maintenance actions are located in a same area of the aircraft, and the correlation is based on the timing and duration of the routine maintenance action in relation to an amount of the threshold probability of the occurrence of the identified anticipated non-routine maintenance tasks; and
    a generation module configured to generate a task schedule that is a combination of the maintenance schedule and at least one of the identified anticipated non-routine maintenance tasks having the threshold probability of occurring, wherein the generation module generates the task schedule prior to initiating a maintenance action.

2. The maintenance system of claim 1 wherein the planning module determines the correlation by determining anticipated non-routine maintenance tasks to be included during at least one of the routine maintenance actions.

3. The maintenance system of claim 2 wherein the health database further comprises prognostic aircraft health data.

4. The maintenance system of claim 3 wherein the prognostic aircraft health data is utilized in identifying anticipated non-routine maintenance tasks having the correlation with at least one of the routine maintenance actions.

5. The maintenance system of claim 3 wherein the planning module identifies all correlated anticipated non-routine maintenance tasks with highest probabilities of occurrence that can be accomplished in the duration of the routine maintenance actions.

6. The maintenance system of claim 1 wherein the maintenance database, non-routine maintenance database, and health database comprise a single database.

7. The maintenance system of claim 6 wherein the planning module is executed on a computer configured to access the single database.

8. The maintenance system of claim 1, further comprising a business rules module that identifies which of the anticipated non-routine maintenance tasks can be completed to meet operational objectives.

9. The maintenance system of claim 1 wherein the same area comprises the same panel on the aircraft.

10. The maintenance system of claim 1 wherein the planning module does not identify anticipated non-routine maintenance tasks having a threshold probability of occurrence that is below a predetermined threshold.

11. A method of planning maintenance for a fleet of aircraft, the method comprising:
    identifying, by a computer, a maintenance schedule having at least one routine maintenance action for an aircraft to be maintained and including timing and duration of the routine maintenance action;
    generating, by the computer, a non-routine maintenance schedule, wherein the generating includes identifying comprising anticipated non-routine maintenance having a threshold probability of anticipated occurrence based on historical data for the fleet and aircraft health data, a correlation of the anticipated non-routine maintenance located in a same area of the aircraft as the at least one routine maintenance action, and a correlation of the anticipated non-routine maintenance based on the timing and duration of the routine maintenance action in relation to an amount of the threshold probability of anticipated occurrence of the identified anticipated non-routine maintenance;
    generating a task schedule comprising a combination of the maintenance schedule and the non-routine maintenance schedule and displaying the generated task schedule to a user; and
    initiating maintenance according to the task schedule;
    wherein the generating a non-routine maintenance schedule occurs prior to the initiating maintenance.

12. The method of claim 11 wherein the longer the duration of the routine maintenance action, the lower the threshold probability of anticipated occurrence of the anticipated non-routine maintenance to be included in the generated non-routine maintenance schedule.

13. The method of claim 12 wherein the threshold probability of anticipated occurrence of the anticipated non-routine maintenance is determined by determining a potential failure in at least one component of the aircraft.

14. The method of claim 13 wherein determining a potential failure in the at least one component comprises evaluating at least one of multiple constraints, said multiple constraints including a predicted life of the component or a failure rate of the component.

15. The method of claim 14 wherein the determining the failure rate comprises determining at least one of an actual failure rate or an artificial failure rate.

16. The method of claim 15 wherein determining the artificial failure rate, including a time to failure, further comprises determining the artificial failure rate from prognostic health data.

17. The method of claim 11, further comprising continuously determining what anticipated non-routine maintenance tasks have a correlation with at least one of the routine maintenance actions.

* * * * *

UNITED STATES PATENT AND TRADEMARK OFFICE
CERTIFICATE OF CORRECTION

PATENT NO.         : 9,251,502 B2                                    Page 1 of 1
APPLICATION NO.    : 13/666394
DATED              : February 2, 2016
INVENTOR(S)        : Schoonveld It is certified that error appears in the above-identified patent and that said Letters Patent is hereby corrected as shown below:

In the Specification

In Column 3, Lines 43-44, delete "determined" and insert -- determined. --, therefor.

In the Claims

In Column 8, Line 29, in Claim 11, delete "comprising anticipated" and insert -- anticipated --, therefor.

Signed and Sealed this
Nineteenth Day of July, 2016

Michelle K. Lee
*Director of the United States Patent and Trademark Office*